United States Patent [19]

Eliscu

[11] 4,278,332
[45] Jul. 14, 1981

[54] TABLE APPARATUS FOR HOLDING AND MOVING CELS FOR PRODUCING ANIMATED MOTION PICTURES

[75] Inventor: Joshua Eliscu, Tucson, Ariz.

[73] Assignee: Elisola Enterprises, Inc., Tucson, Ariz.

[21] Appl. No.: 45,784

[22] Filed: Jun. 5, 1979

[51] Int. Cl.³ .............................................. G03B 21/32
[52] U.S. Cl. ........................................ 352/87; 352/52
[58] Field of Search ................. 352/87, 50, 51, 52; 355/53

[56] References Cited

U.S. PATENT DOCUMENTS

| | | | |
|---|---|---|---|
| 1,633,547 | 6/1927 | Hurd | 352/87 |
| 2,153,902 | 4/1939 | Tondreau | 352/87 |
| 2,198,006 | 4/1940 | Garity | 352/87 |
| 2,690,696 | 10/1954 | Ashton | 355/53 |
| 3,495,519 | 2/1970 | Alfsen et al. | 355/53 |
| 3,586,426 | 6/1971 | Bras | 352/87 |
| 3,817,609 | 6/1974 | Vaughn | 352/87 |

Primary Examiner—Monroe H. Hayes
Attorney, Agent, or Firm—H. Gordon Shields

[57] ABSTRACT

Table apparatus for holding and moving cels for producing animated motion pictures includes a plurality of aligned elements movable relative to each other, with each individual element capable of holding a plurality of cels and with the elements of the table selectively movable relative to the table and to the other elements.

26 Claims, 13 Drawing Figures

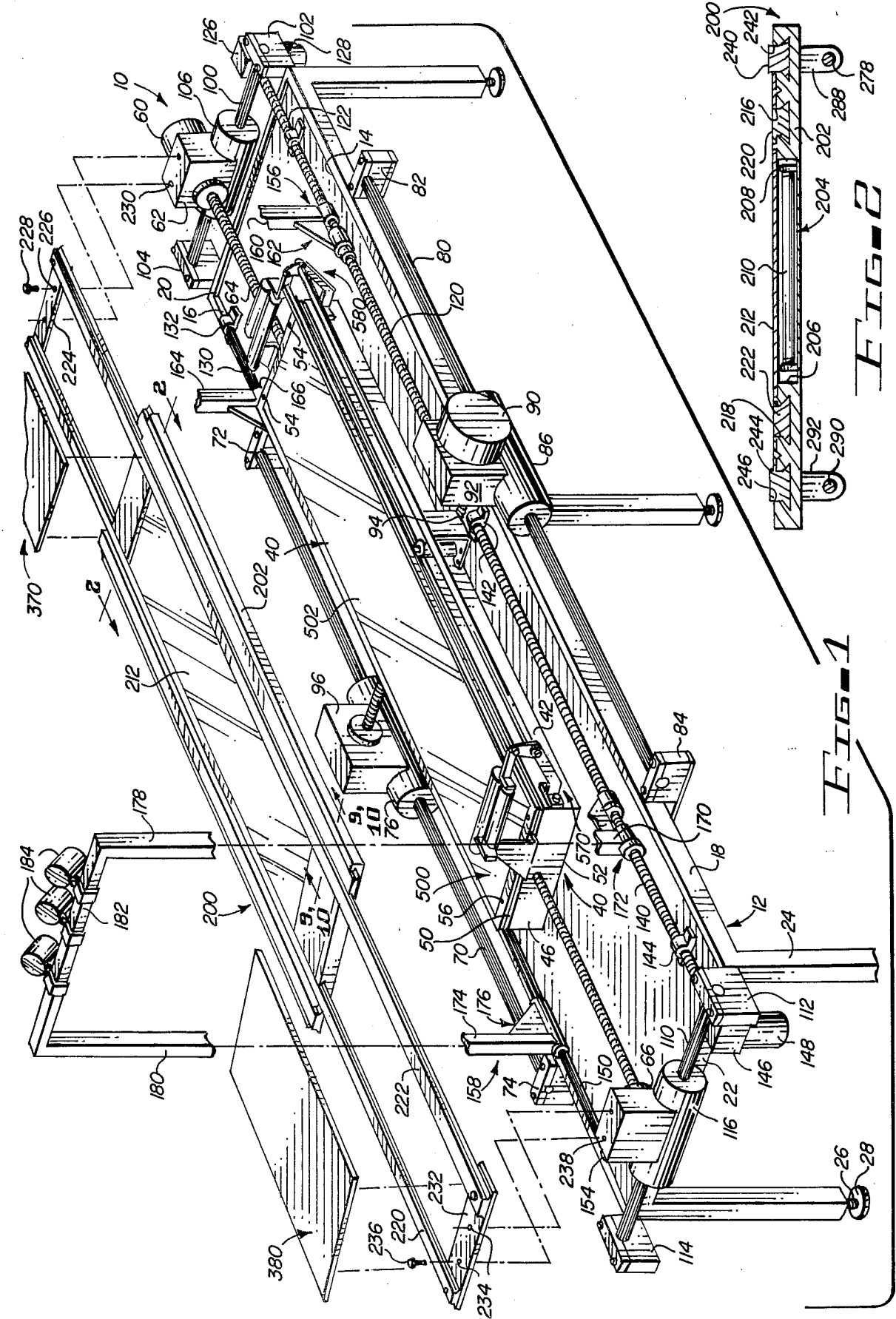

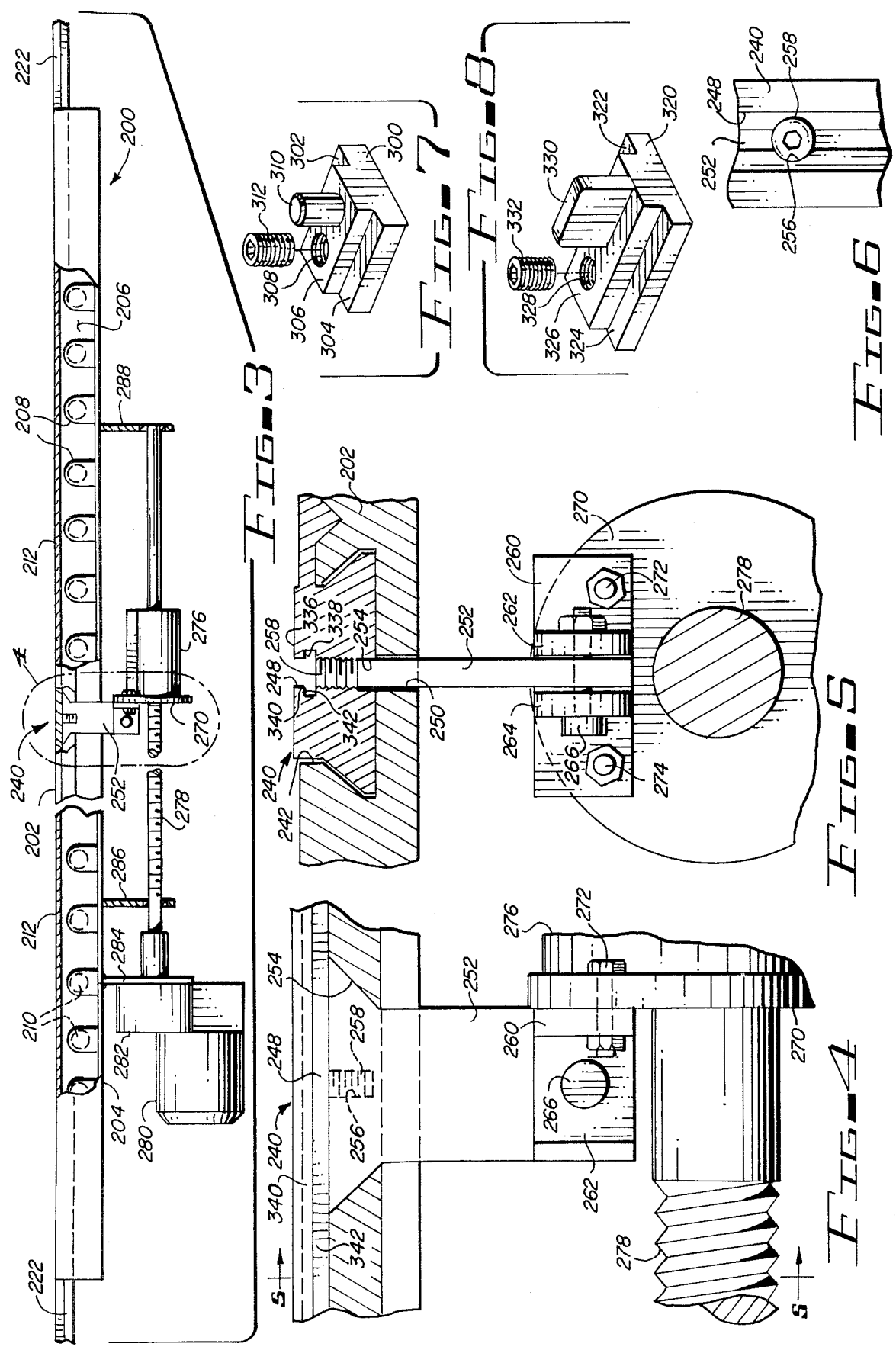

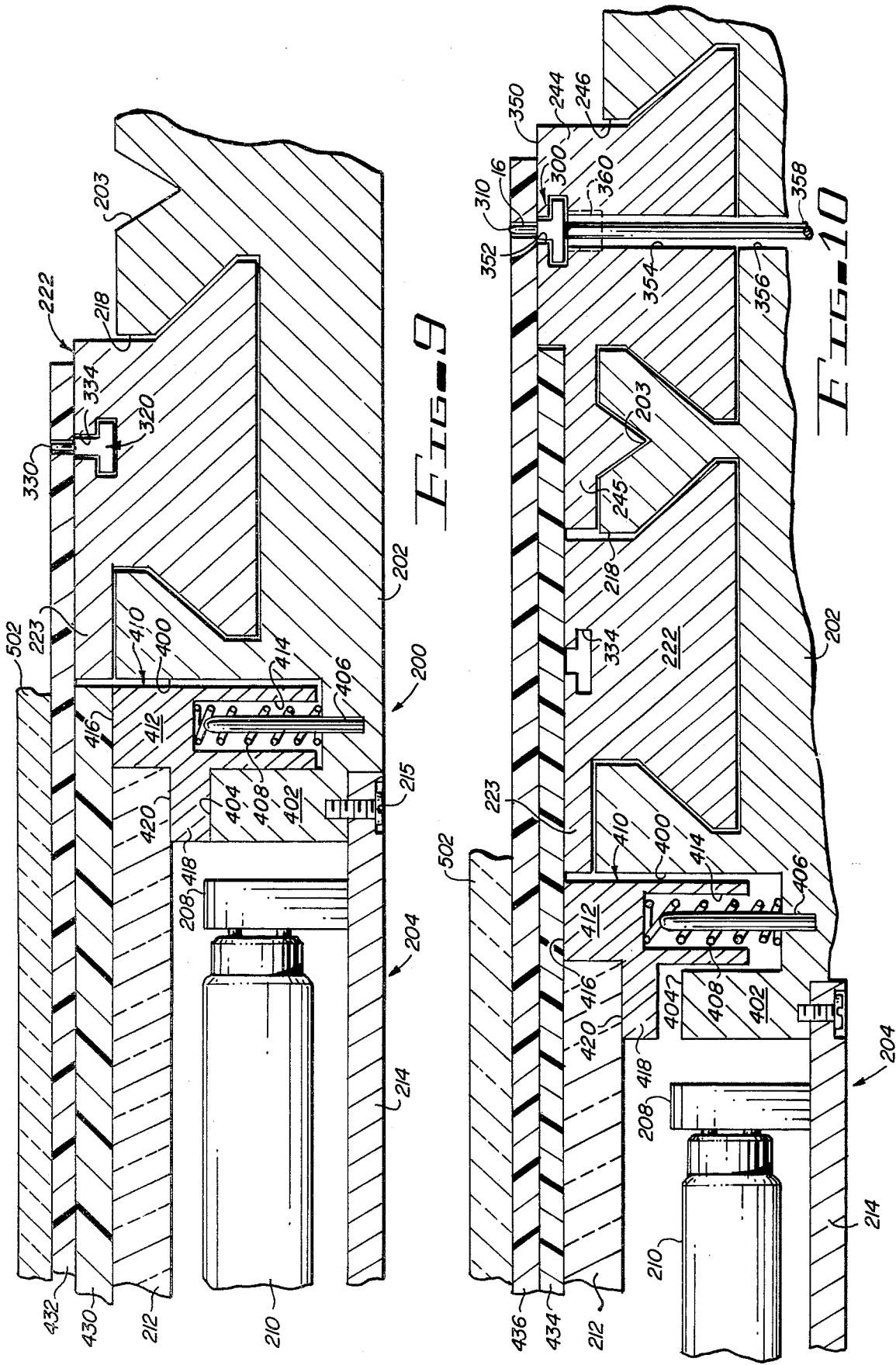

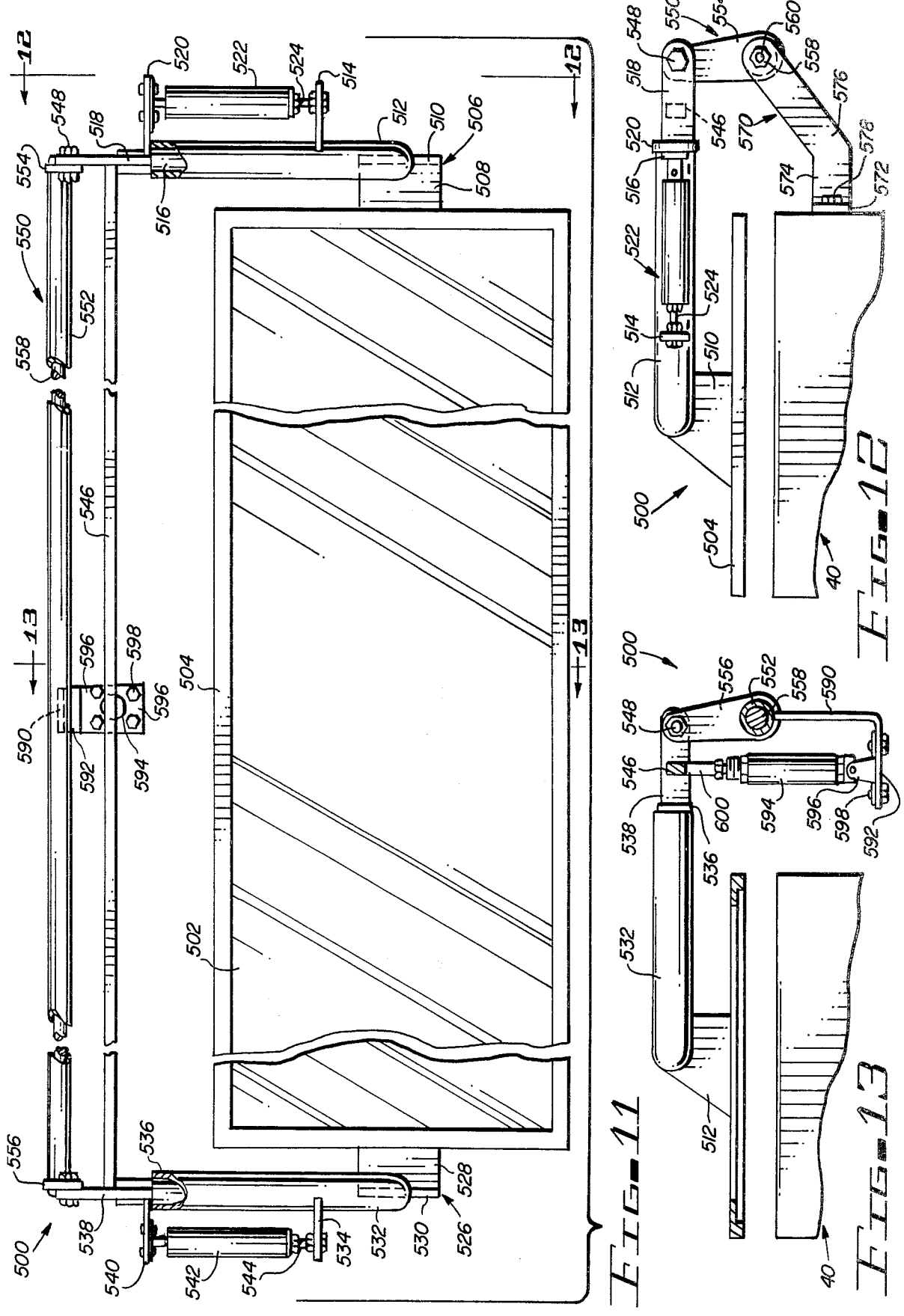

TABLE APPARATUS FOR HOLDING AND MOVING CELS FOR PRODUCING ANIMATED MOTION PICTURES

BACKGROUND OF THE INVENTION

1. Field of the Invention

This invention relates to the making of animated motion pictures, and, more particularly, to table apparatus for holding a plurality of cels in which some or all of the cels are movable relative to each other for animation purposes.

2. Description of the Prior Art

Animated motion pictures comprise a plurality of discrete pictures, with each picture secured to a cel, and with the individual discrete pictures movable relative to each other to simulate movement. Typically, the cels will be movable relative to a stationary camera, or a camera will be movable relative to a plurality of fixed cels. In the alternative, both the cels and the camera may be movable relative to each other. When there is more than one movement taking place in a particular scene, there must be relative movement of individual cels. This relative movement requires alignment of the individual cels in a very precise manner to avoid distortion as relative movement is accomplished.

U.S. Pat. No. 1,260,393 illustrates table apparatus for holding a plurality of drawing plates or cels and apparatus for holding and locking the individual drawing cels in a specific location for sequentially photographing the cels. The simulation of relative movement is accomplished by sequential photography of the individual cels. The apparatus presses the individual drawings or cels together so that the individual pictures appear to be in substantially the same plane. The individual cels are moved relative to each other by movement of a single arm which is secured to a single picture. That is, each picture is held by a single arm and relative movement of that picture is accomplished by movement of the arm holding that picture.

A rather complicated table apparatus for providing relative movement for individual cels is illustrated in U.S. Pat. No. 2,152,921. The table apparatus in the '921 patent includes a plurality of hydraulic cylinders, each of which is secured to a portion of the table to which cels are secured. In addition to the hydraulic controls, rack and pinion gear arrangements are also included for moving portions of the table.

Electric motor drive for providing relative motion on different portions of a table is illustrated in U.S. Pat. No. 2,198,006. The apparatus of the '006 patent provides a multi-level cel holding apparatus, each of which levels is movable relative to the others.

U.S. Pat. No. 2,837,962 illustrates another type of table apparatus for providing relative motion in which a plurality of parallel slide bars are connected to gears secured to a single shaft. Each slide bar is secured to a single gear, and the diameters of the gears differ from each other. Accordingly, rotary movement of the shaft results in relative movement of each of the slide bars in a different amount. The slide bar connected to the gear with the fewest number of teeth will appear to move faster relative to each of the other slide bars, and so on, with the slide bar connected to the gear with the largest number of teeth appearing to move slowest relative to the other slide bars.

U.S. Pat. No. 3,288,548 discloses still another type of table which provides relative movement of cels for producing animated motion pictures. The table apparatus of the '548 patent includes a plurality of levels, with apparatus for indexing or keying movement of each of the various layers of the table to the frame exposed in the camera by means of a flexible drive shaft.

U.S. Pat. No. 3,556,646 discloses another type of table for producing relative movement of individual drawings or cels. The primary teaching of the '646 patent is the use of a movable camera to obtain proportionate distances to generate the illusion of movement in space.

A motor control system for controlling the exposure of successive frames of film is illustrated in U.S. Pat. No. 3,817,609. The control system of the '609 patent is used in amination photography to provide illusions of acceleration and deceleration, primarily. The control system also includes the control of the movement of individual portions of a table holding various drawings or cels for movement relative to each other.

SUMMARY OF THE INVENTION

The invention described and claimed herein comprises a table which includes a plurality of elements movable relative to each other and the movable elements also move relative to the fixed frame of the table in two dimensions and the table provides its own light source for illuminating discrete cels secured to the movable portions of the table for photographic purposes.

Among the objects of the present invention are the following:

To provide new and useful apparatus for simulating movement for making animated motion pictures;

To provide new and useful simplified apparatus for providing relative movement of a plurality of individual photographic cels;

To provide new and useful apparatus for providing relative movement of several portions of a fixed table;

To provide new and useful table apparatus having a plurality of portions movable relative to each other;

To provide new and useful photographic table apparatus having a simplified movement and control system for animated motion pictures;

To provide new and useful table apparatus having a plurality of parts in aligned relation with each other and movable relative to each other;

To provide new and useful simplified table apparatus having relative movement among several parts;

To provide new and useful animation table apparatus having a movable light box;

To provide new and useful table apparatus having a light box with a spring loaded frame;

To provide new and useful apparatus for holding animation cels;

To provide new and useful table apparatus having rails for holding animation cels;

To provide new and useful table apparatus having fixed and movable rails for holding animation cels.

BRIEF DESCRIPTION OF THE DRAWING

FIG. 1 comprises a perspective view of the apparatus of the present invention showing various portions exploded or separated from the table and from each other.

FIG. 2 is a view in partial section of a portion of the apparatus of FIG. 1 taken generally along line 2—2 of FIG. 1.

FIG. 3 is a view in partial section of a portion of the apparatus of FIG. 1 illustrating the motor control apparatus for moving a portion of the apparatus.

FIG. 4 is an enlarged fragmentary view of the apparatus of FIG. 3 taken generally from oval 4 of FIG. 3.

FIG. 5 is a view in partial section of a portion of the apparatus taken generally along line 5—5 of FIG. 4.

FIG. 6 is a top view of a portion of the apparatus of FIGS. 4 and 5.

FIG. 7 is an enlarged perspective view of one form of pin arrangement used for securing cels to the table apparatus of the present invention.

FIG. 8 is an enlarged perspective view of a second type of pin arrangement used for securing cels to the apparatus of the present invention.

FIG. 9 is a view in partial section of a portion of the apparatus of FIG. 1 taken generally along line 9—9 of FIG. 1.

FIG. 10 is a view in partial section of a portion of the apparatus of FIG. 1 taken generally along line 10—10 of FIG. 1.

FIG. 11 is a top view of a portion of the apparatus of FIG. 1.

FIG. 12 is an end view of the apparatus of FIG. 11, taken generally along line 12—12 of FIG. 11.

FIG. 13 is a view in partial section of a portion of the apparatus of FIG. 11 taken generally along line 13—13 of FIG. 11.

DESCRIPTION OF THE PREFERRED EMBODIMENT

FIG. 1 comprises a perspective rear view of table apparatus 10 embodying the present invention. Portions of the table are exploded for clarity in showing the various subcombinations or subassemblies which comprise the overall table apparatus. Table apparatus 10 comprises a relatively long and somewhat narrow bed, generally designated by reference numeral 12. The bed is of a trough shape or configuration which includes a bottom 14, a front side wall 16, a rear side wall 18, and a pair of end walls 20 and 22. The four walls are secured to the bottom, and are rather shallow in that they extend above the bottom 14 only a relatively short distance. The bed, including the bottom and the four walls, are preferably made of metal, and are appropriately sealingly secured together to make the bed or trough relatively fluid tight. Six legs 24 are secured to the bed, which is of a generally rectangular shape. Four of the legs 24 are secured to the respective four corners of the bed, and two extra legs are shown disposed at the center of the bed. The center legs extend downwardly from the front and back walls midway between the end walls. Each of the six legs includes a leveler screw 25 which is secured to a pad 28. An appropriate internally threaded element which the screw 26 engages is secured to the interior of each leg. The pad 28 makes contact with the floor. The employment of a leveling screw on each leg insures that the table may be made stable and level regardless of the contour of the floor on which the table apparatus is disposed. Variations in floor heights may thus be compensated for.

A rectangular slide box 40 is secured to the table and is disposed slightly above the bottom 14 of the table bed 12. The slide box 40 is of a relatively elongated rectangular configuration, having a pair of elongated side walls, of which a rear side wall 42 is shown in FIG. 1. The side walls are substantially parallel to each other and are generally parallel to the side walls 16 and 18 of the bed 12. The slide box 40 includes a pair of end walls, of which one end wall 46 is shown in FIG. 1. The slide box also includes a top 50 and a bottom 52. The side walls, end walls, the top and the bottom are appropriately secured together to comprise or to define the slide box. The slide box is preferably made of metal, such as aluminum plates.

On the top 50 of the slide box 40, and adjacent the end wall 46, are a pair of apertures 56. A similar pair of apertures 54 also extend through the top 50 adjacent the opposite end wall. The apertures 56 and 54 may be tapped to receive threaded elements, such as screws, to secure to the slide box a light box 200.

The slide box 40 moves on the bed 12 of the table in both X and Y directions. For purposes of this application, the X direction of movement of the slide box 40 is defined as between the end walls 20 and 22, and movement in the Y direction is defined as between the front and rear side walls 16 and 18. Movement in the X direction is controlled by a reversible motor 60 which extends outwardly from a motor housing 62. The housing 62 includes appropriate gears, and the like. The motor 60 causes rotation of a threaded shaft 64. The shaft 64 extends from the motor housing 62, through the slide box 40, and to another housing 66 remote from the housing 62 and motor 60 and located at the opposite end of the table bed 12 therefrom.

Rotation of the threaded member or rod 64 causes the slide box 40 to move because the threaded rod extends through threaded members or collars, well known and understood, in the box which are secured to the box and not movable relative thereto. Accordingly, as the shaft or rod 64 rotates, lateral (X direction) movement of the slide box results.

The X direction movements of the slide box 40 are kept aligned with respect to the table apparatus 10 by means of a pair of substantially parallel splined shafts 70 and 80. The shaft 70 is secured to the table by a pair of support blocks 72 and 74. A bearing guide 76 moves axially along the splined shaft 70.

The splined shaft 80 is secured to the table apparatus by a pair of support blocks 82 and 84. A bearing guide 86, substantially identical to the bearing guide 76, moves axially along the splined shaft 80.

Movement of the slide box 40 in a Y direction is controlled by a Y direction reversible motor 90 which is secured to a motor and gear housing 92. The housing 92 is in turn disposed on, and secured to, the bearing guide 86. A threaded shaft 94 extends from the housing 92, through the side 42 of the slide box 40, through the slide box 40, and through the side opposite or parallel to the side 42 (not shown), and to a housing 96 secured to and disposed on top of the bearing guide 76. The screw 94 extends through a pair of threaded collars, well known and understood in the art, disposed within and secured to the slide box 40 such that rotary or rotational movement of the threaded shaft 94 results in the movement of the slide box 40 in the Y direction. It will be noted, from the rendering of FIG. 1, that the Y direction movement of the slide box 40 is substantially less than the movement of the slide box in the X direction, distance-wise.

The movement of the slide box in the Y direction is carefully controlled by means of a pair of parallel splined shafts 100 and 110. The splined shaft 100 is secured to the table by a pair of support blocks 102 and 104. The blocks 102 and 104 are secured adjacent two corners of the table. Similarly, the splined shaft 110 is secured to the table by a pair of support blocks 112 and 114. The support blocks 112 and 114 are secured adjacent the opposite ends of the table from the support blocks 102 and 104. The splined shafts 100 and 110 are disposed substantially parallel to each other and, except for their length, are substantially identical to the splined shafts 70 and 80.

A bearing guide 106 is movably disposed on the splined shaft 100. A bearing guide 116 is similarly disposed on the splined shaft 110. The housing 62, discussed above in conjunction with the X direction motor 60, is secured to and movable with the bearing guide 106, while the housing 66, also discussed above, is secured to and movable with the bearing guide 116. The reversible motors 60 and 90 are substantially identical to each other, as are the threaded shafts 64 and 94, except for length. Similarly, the threaded collars (not shown) secured to and disposed within the slide box 40 and through which the respective threaded rods 64 and 94 extend, are substantially identical.

From the above discussion of the slide box 50, its associated screws and motors, and the splined shafts on which the motors move, it will be understood that the movements of the slide box 40 in both the X and Y directions are carefully controlled and that during such X and Y movements the slide box maintains a very precise orientation. As the slide box 40 moves in the X directions, both toward and away from the ends 20 and 22 of the table bed 12, the slide box maintains its substantially parallel orientation between the shafts 70 and 80. Similarly, when the slide box moves in the Y directions, both toward and away from the front and rear side walls 16 and 18, respectively, the slide box maintains a very precise orientation parallel to and between the spline shafts 100 and 110. As the box moves in the X directions, the Y directional motor 90 maintains its position relative to the slide box because the motor 90 is secured to the bearing guide 86 which in turn is secured to and movable on the splined shaft 80, substantially parallel to the splined shaft 70 on which the bearing guide 76 moves and to which the housing 96 is also secured.

As the slide box 40 moves in the Y directions, parallel to and between the splined shafts 100 and 110, the X directional motor 60 moves in conjunction with the Y movements of the slide box because the motor 60 and its housing 62 are both secured to and accordingly are movable with the bearing guide 106 which moves on the shaft 100. The end of the threaded shaft 64 remote from, or located distally from, the motor 60 and housing 62 is secured in the bearing housing 66 which is in turn secured to the bearing guide 116 on the splined shaft 110. The parallel relationship between the pairs of splined shafts results in very accurate and aligned movements of the slide box 40 in both the X and the Y directions.

The X and Y motors 60 and 90 may be either electric or hydraulic motors, as desired. No electrical wiring or controls or hydraulic hoses, tubing, or controls are shown since such components and apparatus are well known and understood in the art. It will be understood that the motors selected must, of necessity, control the movements of the slide box very precisely. However, such precision motors, both electric and hydraulic, are known and understood.

Between the slide box 40 and the walls 16 and 18 of the bed 12 are the various elements for a pair of movable light bars 156 and 158. One light bar assembly is disposed at one side or end of the table apparatus 10, and the other is disposed at the opposite end of the table.

At the end of the table closest to the end wall 20, are a pair of shafts 120 and 130, disposed adjacent and parallel to the sides 18 and 16, and substantially parallel to the wall 20. The light bar assembly 156 moves on the shafts 120 and 130. The shaft 120 comprises a threaded shaft supported near the center of the table, that is, between the walls 20 and 22, by a support block 122, and another support block, not shown. The threaded shaft 120 extends to a gear housing 126 which is secured to the end of the table adjacent the wall 20. Extending below the gear housing 20 is a motor 128. The motor 128 turns the threaded shaft 120 for movement of the light bar connected thereto.

The support blocks for the threaded shaft 120 are secured to the bottom 14 of the bed 12 of the table 10. The threaded shaft 120 accordingly is disposed below the top or rim of the sides of the bed, and thus are below the slide box 40 so as not to interfere with the movement of the slide box.

Substantially parallel to the threaded shaft 120 is a splined shaft 130. The splined shaft is supported at its end by a pair of supports, of which a support 132 is shown in FIG. 1. The splined shaft is similarly secured to the bottom 14 of the table bed 12 and differs from the shaft 120 in that it is longitudinally splined and accordingly does not rotate as does the shaft 120. A pair of vertical posts 160 and 164 extend upwardly from the shafts 120 and 122. The vertical post 160 is secured to a bearing and support assembly 162 which is threaded internally to mate with the external threads on the shaft 120. Rotary movement of the shaft 120 accordingly results in axial movement of the vertical post 160 and its bearing and support assembly 162 along the shaft 120.

The vertical post 164 is secured to a bearing guide 166 which moves along the splined shaft 130, axially, in response to movement of the post 160 along the shaft 120. The posts 160 and 164 are tied together for joint movement by a bar to which are secured one or more lights, as discussed below in conjunction with the light bar assembly 158 shown at the opposite end of the table from the posts 160 and 164.

A threaded shaft 140, which is substantially identical to the threaded shaft 120, and in axial alignment therewith, is secured to the bottom 14 of the table bed 12 by a pair of support blocks 142 and 144. The support block 142 supports the end of the shaft 140 remote from the table end 22. The support block 142 includes appropriate bearings, as does the support block 122, to allow the shaft 140 to rotate. A gear housing 146 is secured to the end of the table and connected to the shaft 140. A motor 148 extends beneath the gear housing 146 and is operatively coupled to the shaft 140 to cause rotation, in opposite directions, in response to the proper or appropriate signals. The motors 128 and 148 may be either electric motors or hydraulic motors, as discussed above in conjunction with the motors operatively connected to the slide box 40. A vertical post 170, with its appropriate bearing and support assembly 172, is coupled to the threaded shaft 140. The post 170 extends upwardly, substantially perpendicular to the bottom 14 of the table. The post 170 is substantially identical and perpendicular to the post 160.

Substantially parallel to the threaded shaft 140 is a splined shaft 150. The splined shaft 150 is in axial alignment with the splined shaft 130, and is supported in substantially the same manner. A portion of the support block 154 may be seen in FIG. 1 for supporting one end of the splined shaft 150. The support block 154, like the other support blocks for the threaded and splined shafts, is secured to the bottom 14 of the table bed 12. A vertical post 174, with its bearing guide and support assembly 176, is connected to the splined shaft 150 for axial movement therewith. The post 174 is substantially parallel to the post 170 and is also parallel and aligned with the post 164. The light bar assembly 158, which includes the vertical posts 170 and 174, is movable on the shafts 140 and 150.

Shown spaced apart vertically from the posts 170 and 174 is a pair of outer sleeves 178 and 180, respectively. The outer sleeves 178 and 180 each have an internal diameter which is somewhat larger than the external diameter of the posts 170 and 174, and accordingly they extend over the posts 170 and 174, respectively. Appropriate thumb screw assemblies, or the like, may be used to secure the sleeves 178 and 180 in position, vertically, on the posts 170 and 174, as required. In this manner, the sleeves 178 and 180 may be disposed or oriented vertically with respect to the posts 170 and 174, and also with respect to the table, as desired. A bar 182, which may be curved or straight, extends between and is secured to the sleeves 178 and 180. Extending downwardly from the bar 182 are shown three lights 184. The lights 184 are individually adjustable and accordingly may be positioned and directed or focused at the table, as required. Appropriate electrical connections for the lights 184 are not shown in FIG. 1, since their use and operation is well known and understood. The sleeves and light bar connected to the posts 160 and 164 are substantially identical to the light bar assembly shown in conjunction with the posts 170 and 174.

Rotary movement of the shafts 120 and 140 accordingly cause movement of the respective posts, with the light bars secured thereto, so as to enable the light bars, with their lights attached to them, to be positioned as desired with respect to the table apparatus 10, and particularly with respect to the slide box 40, and to apparatus secured thereto, as discussed below. It will be noted that the motors 128 and 148, coupled respectively to the threaded shafts 120 and 140, may be moved independently of each other to thus position their respective light bars in any manner so desired. However, ot will also be noted that, while both the threaded and splined shafts are disposed or are located beneath the top of the side and end walls of the table, and thus are below the slide box 40, the vertical posts and sleeves for the light bars obviously may interfere with movement of the slide box itself, and accordingly must be moved if the slide box 40 is in turn moved adjacent the posts. While the table 10 moves in both X and Y directions, the light bar assemblies move only in X directions since their respective threaded and splined shafts are secured to the table and are oriented only in the X directions. However, the lights themselves are movable on their bars in the Y directions.

A light box 200, shown spaced apart from the bed 12 and slide box 40 in FIG. 1, is disposed on and secured to the slide box 40. In FIG. 1, a pair of holes 54 and another pair of holes 56, all of which ar tapped, are shown extending downwardly through the top 50 of the slide box 40. The tapped holes or apertures receive appropriate screws which secure the light box 200 to the top 50 of the slide box 40.

FIG. 2 comprises a view in partial section of the light box 200 taken generally along line 2—2 of FIG. 1. FIG. 3 comprises a side view of the light box 200, partially broken away and in partial section. For convenience in discussing the light box 200 and its relationship to the slide box 40, and to the other elements of the table apparatus 10, reference will be made to FIGS. 1, 2, and 3.

The light box 200 includes a frame 202 preferably made of structural metal, such as aluminum or steel, with a central light portion 204, and four rails. The rails include a pair of fixed inner rails 220 and 222, which are substantially parallel to and spaced apart from each other. The rails 220 and 222 are disposed in a pair of parallel slots 216 and 218 in the frame 202 of the light box 200. As best shown in FIG. 2, the slots 216 and 218 have a mating configuration with their respective rails 220 and 222.

As indicated, the rails 220 and 222 are fixed, and the light box 200, secured to thhe slide box 40, moves on the rails 220 and 222. At one end, the rails 220 and 222 are secured to a plate 224 by appropriate means, such as screws or bolts. In turn, the plate 224 is secured to the housing 62 to which the motor 60 is secured. The top of the housing 62 includes a pair of tapped apertures or holes 230 which mate with a pair of aligned holes 226 which extend through the plate 224. A pair of screws, such as screw 228, extends through the holes 227 and into the tapped holes 230 to secure the plate 224, and one end of the rail 220 and 222, to the motor housing 62.

The opposite ends of the rails 220 and 222 are in turn appropriately secured to a plate 232. The plate 232 includes a pair of holes 234 which extend through the plate 232, substantially the same as the holes 226 of the plate 224. The housing 66, which extends upwardly trom the bearing guide 116, includes a pair of tapped holes 238 extending through the top of the housing 66. The holes 238 align with the holes 234 to receive a pair of screws 236 which secure the plate 232, with the rails 220 and 222 secured thereto, to the top of the housing 66.

The rails 220 and 222 are secured to the housings 62 and 66, and the housings are in turn secured to the bearing guides 106 and 116, respectively. The rails 220 and 222 accordingly move in the Y directions with the slide box 40. Moreover, the light box 200 is secured directly to the slide box 40, and accordingly the light box 200 also moves in the X directions with the slide box 40 on the rails 220 and 222. That is, the rails and the slide box move in a unitary manner, or together, in the Y direction, while the light box 200 moves relative to, or independently of, the rails 220 and 222 in the X directions.

As best shown in FIGS. 2 and 3, the center of central light portion 204 of the light box 200 includes a lamp chamber 206 disposed within the frame 202 and between the rails 220 and 222. Within the lamp chamber are a plurality of lamp fixtures 208, which are spaced apart from each other, and which receive a plurality of lamps 210. The lamps 210 are preferably flourescent lamps, and thus each lamp requires a pair of lamp fixtures, one disposed at each end of the flourescent lamps or tubes. As shown in FIG. 2, and as may be inferred from FIG. 3, the lamps or tubes 210 extend substantially perpendicular to the rails 220 and 222 within the chamber 206.

The top of the lamp chamber 206 is enclosed by a cover 212, which is preferably made of glass or methly methacrylate, which is typically sold under the trade name "Plexiglass". For lighting purposes, the cover 212 is preferably translucent for diffusing the light produced by the lamps 210. If desired, of course, the cover 12 may also be clear. The lamp chamber 206 preferably extends substantially the entire length (or width) of the light box 200.

Outboard of the rails 220 and 222, and substantially parallel to them, are a pair of rails 240 and 244 which are movable in a pair of matings slots 242 and 246, respectively. The rails 240 and 244 are substantially identical to the rails 220 except in length and in relative movement. The outboard rails 240 and 244 are substantially shorter than the rails 220 and 222, and they move independently of each other and relative to the light box 200, as best illustrated in conjunction with FIGS. 3, 4, and 5.

FIG. 4 is an enlarged view of a portion of the apparatus of FIG. 3 taken generally from the oval 4 of FIG. 3. FIG. 5 is a view in partial section of the apparatus of FIG. 4 taken generally along line 5—5 of FIG. 4. In the following discussion of the movement of rails 240 and 244, attention will be directed primarily to FIGS. 3, 4, and 5, in addition to FIGS. 1 and 2. Other details of the rails, both the fixed and movable rails, will be discussed below in conjunction with FIGS. 9 and 10.

As discussed above, the light box frame 202 is secured to the slide box 40, and moves in conjunction therewith on the rails 220 and 222. The rails 220 and 222 are secured to the top portions of the housings 62 and 66 and accordingly move as the housings move in the Y directions. The rail 222 is shown in FIG. 3 as extending outwardly of the light box 200. The chamber 206 is shown in FIG. 3 by removing or breaking a portion of the light housing 204 away to reveal the lamp or light housing 204. A further portion of the lamp housing 204 is broken away, as disclosed in the elongated circle 4 of FIG. 3, to reveal one of the inner rails, namely inner rail 240, which moves independently with respect to the light box 200. The inner or interior rails 220 and 222 are fixed, as discussed above, while the outer, shorter rails 240 and 244 move relative to each other and relative to the light box 200, and the movement of each rail is independent of the movement of the light box 200 or of the opposite (other) rail.

As best shown in FIG. 5, which is a view in partial section of the apparatus of FIG. 4 taken generally along line 5—5 of FIG. 4, the rail 240 is disposed in a groove 242 in the frame 202 of the light box 200. The light box frame 202 also includes a slot 250 which communicates with the lower or bottom portion of the groove 242 to accommodate a plate 252. The plate 252 extends through the slot 250 and into a groove 254 which in turn extends through the rail 240 to communicate with a slot or groove 248 in the rail 240. The slot or groove 248 extends downwardly from the top surface of the rail 240. The purpose of the groove 248 will be discussed below, in conjunction with the pin apparatus illustrated in FIGS. 7 and 8.

The plate 252 is secured to the rail 240 by means of a set screw 258 which extends into a tapped aperture 256. As best shown in FIGS. 5 and 6, the tapped aperture 256 extends through portions of both the plate 252 and the rail 240 and downwardly from the bottom of the groove 248. When the set screw 258 is in place, its external threads accordingly make contact with the tapped portions of the rail 240 and of the plate 252.

FIG. 6 is a top view of a portion of the apparatus of FIGS. 4 and 5, showing the set screw 258 in its tapped aperture 256. The aperture 256 extends through both the rail 240 and the plate 252 and the set screw accordingly makes contact with both elements or members 240 and 252.

The plate 252, secured to the rail 240, extends downwardly through the grooves or slots 250 and 254 where it is connected, at its lower or bottom end, remote from the rail 240, to a plate or bracket 260, as shown in FIGS. 4 and 5. The plate or bracket 260 includes a pair of parallel arms 262 and 264, as best shown in FIG. 5, which define a recess into which the lower portion of the plate 254 extends. The plate 252, and the arms 262 and 264 include aligned apertures through which appropriate fastening means, such as a bolt 266, extends to secure the plate 252 to the bracket 260. In turn, the bracket 260 is secured to a plate 270 by appropriate fastening means, such as a pair of bolts 272 and 274. The plate 270 is secured to one end of a ball bearing screw nut 276. Thus, the rail 240 is ultimately secured to the ball bearing screw nut 276 through appropriate mechanical connections, comprising brackets and plates secured together, so that movement of the ball bearing screw nut 276 results in movement of the rail 240.

A threaded screw shaft 278 extends through the ball bearing screw nut 276. Rotation of the screw shaft 278 in turn results in movement of the ball bearing screw nut 276 along the shaft 278. The movement of the ball bearing screw nut 276 in turn results in movement of the rail 240.

The screw shaft 278 is driven by a motor 280 (see FIG. 3) through a gear drive 282 which is secured to a plate 284. The plate 284 is in turn secured to the light box 220. The motor 280 and the gear apparatus 280 are secured together in a manner well known and understood in the art. One end, the driven end, of the screw shaft 278 extends through an appropriate bearing 286, which is secured to the light box 200, and into the gear box 282 for securing to the appropriate gear therein. The distal end of the screw shaft 278 is supported by an appropriate bearing 288, remote from the bearing 286 and the motor 280. The bearing 288 is also secured to the light box 200.

The motor 280 may be an electric motor, a hydraulic motor, or a pneumatic motor, as desired. The motor 280 is preferably a reversible motor to provide movement of the rail 240 in two directions.

The rail 244, as shown in FIG. 2, includes its own motor (not shown) which drives a screw shaft 290 to cause the rail 244 to move in two directions. As shown in FIG. 2, the screw shaft 290 is supported by a bearing support 292, secured to the light box 200. The apparatus described above in conjunction with the rail 240 is substantially identical to the rail 244.

The purpose of the rails 220, 222, 240, and 244 is to support cels over the lamp chamber 206 of the light box 200 for photographing. The glass or plexiglass cover 212, which covers the lamp chamber 206, is disposed beneath the plurality of cels and the cels are thus illuminated from underneath by the plurality of lamps 210 within the light portion 204 of the light box 200. Additional illumination is provided by the lights, such as lights 184, secured to the bar 182 (see FIG. 1), and by a similar set of lights substantially the same as the lights 184, which are disposed at the opposite ends of the light box and the slide box from the lights 184. The vertical posts 170 and 174, at one end of the slide box (and light box) and the vertical posts 160 and 164, at the opposite end of the slide box (and light box) support the lamps which provide downward illumination for cels supported on the light box.

The cels are supported by pins which are in turn secured to the rails 220, 222, 240, and 244. The pins are shown in FIGS. 7 and 8.

FIG. 7 comprises a perspective view of a center pin block 300. FIG. 8 comprises a perspective view of an end or outside pin block 320. A single center pin block 300, and a pair of outside or end pin blocks 320 are used to hold each cel to a rail. Since a cel extends between a pair of rails, two center pin blocks 300, and four outside blocks 320, are used for each cell. Referring again to FIG. 2, a single cell may be secured between the inside rails 220 and 222, or between the rails 240 and 222, or rails 240 and 244, or any appropriate combination, as desired.

The pin block 300, shown in FIG. 7, includes a pair of longitudinally extending side recesses 302 and 304, which comprise smaller relieved portions extending downwardly and outwardly from opposite sides of the upper or top surface of a center boss 306. Extending downwardly through the pin block 300 from the top surface of the center boss 306 is a tapped aperture 308. A cylindrical pin 310 extends upwardly from the center boss 306. A set screw 312 is shown spaced apart from (directly above) the tapped aperture 308. The set screw 312 is used to lock the block 300 in position in a rail.

The pin block 320, shown in FIG. 8, is of substantially the same configuration, generally, as is the pin block 300, except that the pin block 320 is slightly longer to accommodate an elongated pin 330. The pin block 320 includes a pair of side recesses 322 and 324, which extend downwardly and outwardly on opposite sides of a center boss 326. The recesses 322 and 324 extend downwardly and outwardly to define a center boss 326. The recesssss 322 and 324 are substantially parallel to each other, as are the recesses 302 and 304 of the block 300. A tapped aperture 328 extends downwardly through the block 320 from the upper or top surface of the boss 326. A set screw 322 is shown spaced apart from the aperture 328. The set screw extends through the aperture 328, which threadedly receives the set screw 322, to lock the block 320 in position.

The pin 330, which extends upwardly from the boss 326, is elongated, substantially parallel to the length of the block 320. The pins 310 and 330 are accordingly distinctive and the holes in a cel which receive the blocks, accordingly vary in configuration from each other. That is, a cylindrical pin 310 will not fit through a hole or aperture in a cel designed for an outside pin, such as pin 330. Neither will a hole or aperture in a cel designed for a center pin 310 receive an outside pin 330.

FIG. 5 best illustrates how the blocks 300 and 320 are designed to be secured to a rail. The groove 248 is of substantially the same configuration as the blocks 300 and 320. The blocks 300 and 320 are designed to extend through grooves, such as the groove 248, and to slide freely in place therein until they are locked in place by their respective set screws.

The slot 248 includes a pair of inwardly extending flanges 336 and 348, each of which includes a bottom surface, identified in FIG. 5 by reference numerals 338 and 342, respectively. Thus, the configuration of the slot 248 matches the exterior configuration of the pin blocks which are movable in the slot 248 until they are secured in place. The top surface of the boss 306 is substantially flush with the top of the rails when the pin blocks are secured in place, because the distance between the top surface of the boss 306 and the upper surface of each recess is substantially the same as the thickness of the inwardly extending flanges, such as the flanges 336 and 340, of the grooves in all four rails.

When a pin block is the proper position in a rail, a set screw, such as the set screw 312 shown in FIG. 7, is threadedly engaged in the tapped aperture 308. As the set screw 312 extends through the block 300, the bottom surface of the set screw 312 makes contact with the bottom of the groove 248. The continued of the set screw in the aperture 308 causes the block 300 to rise in the groove 248 until the top surfaces of the recesses 302 and 304 contact a pair of lower surfaces 338 and 342 of the inwardly extending flanges 336 and 340, respectively.

FIG. 9 comprises an enlarged view in partial section of the light box apparatus 200, illustrating details of the lamp chamber 206 and one of the fixed rails, rail 222. FIG. 9 is taken generally along line 9—9 of FIG. 1.

As previously indicated, the light box 200 includes two primary portions, a frame portion 202 and a light portion 204. The light or lamp portion 204 in turn includes a bottom panel 214, which is appropriately secured to the frame 202 by a plurality of fastening members, such as screw 215. The bottom panel 214 preferably fits into a recess or slot disposed at the outer periphery of the panel to define a relatively smooth bottom portion for the light box 200.

The light portion 204 includes a lamp chamber 206 in which are disposed a plurality of lamp fixtures 208. In FIG. 9, the lamp fixture 208 is shown extending upwardly from a bottom panel 214. The fixture 208, and a plurality of other fixtures, such as best shown in FIG. 3, are also secured to the top or upper portion of the panel 214. The lamp 210 is shown in turn extending horizontally from the fixture 208. It is shown and understood that a pair of fixtures 208 are spaced apart to receive lamps, with a pair of fixtures receiving a single lamp. The lamps 210 are preferably flourescent lamps, details of which are known and understood. Accordingly, the electrical circuitry elements are not shown herein.

Adjacent the light portion 204 of the light box 200 is a pair of spaced apart and longitudinal extending slots 400. The slots 400 extend vertically downwardly from the top or upper surface of the frame 202. A wall 402 is disposed between the slot 400 and the lamp chamber 206. The wall 402 comprises a vertically extending wall whose top surface defines a shoulder 404. The shoulder 404, and thus the wall 402, terminates downwardly from the top surface of the light box 200, as will be explained below.

Extending upwardly from the bottom of the slot 400 is a plurality of pins 406. The pins are spaced apart from each other throughout the length of the slot 400. A compression spring 408 is disposed over each pin 406.

A frame 410 is shown in FIG. 9 extending downwardly into the slot 400 and disposed on the shoulder 404 of the wall 402. The frame 410 includes a vertical wall 412 which is disposed in the slot 400. Extending upwardly from the bottom surface of the vertical wall 412 is a slot 414 which receives the pins 406 and springs 408. If desired, rather than having a continuous slot 414 extending upwardly within the vertical wall 412, the slot 414 may comprise a plurality of vertically extending bores, each of which is dimensioned to extend over the pins 406 and their springs 408. The springs 408 extend around the pin 406 between the bottom of the slot 400 and the top of the slot (or bore) 414.

At the top of the wall 412 is a surface 416 which is generally horizontally disposed. Spaced apart downwardly from the top surface 416 is a horizontally inwardly extending arm 418. The horizontal arm 418 comprises a flange which extends inwardly from the vertical wall 412 to the lamp chamber 206. The arm or flange 418 includes on its top a top surface 420, which is spaced downwardly from the top surface 416 of the wall 412, and on which is disposed the glass 212 which covers the lamp chamber 206. Thus, as shown in FIG. 9, the glass 212 is disposed on the surface 420 of the flange or arm 418, which is in turn disposed on the top surface 404 of the wall 402. As will be discussed below in conjunction with FIG. 10, the frame 410 may move vertically, under certain circumstances.

The fixed inner rail 222, shown disposed in its slot 218 in the frame 202, includes a horizontally extending flange 223 which extends inwardly toward the light portion 204 of the light box and terminates generally in line with the slot 400. Extending downwardly from the top surface of the rail 222 is a slot or groove 334 which receives the pin block 320. The pin 330 extends upwardly from the pin block 330. The pin block 320 has been discussed in detail above in conjunction with FIG. 7.

The slot or groove 334 is a generally inverted tee shaped slot, which is substantially the same as the slot or groove 248, discussed above in conjunction with FIGS. 4 and 5. The pin block 320 is appropriately secured within the slot 334 at a desired location, all as discussed above.

As may be seen from FIG. 9, the top or upper surface of the glass 212 is substantially coextensive with the top surface 416 of the wall 412, and accordingly the thickness of the glass 212 is substantially the same dimension as the vertical height or distance between the top surface 420 of the arm 418 to the top surface 416 of the wall 412.

Disposed on the top surface of the glass 212 is a background layer or filler element 430. The background or filler layer 430 is disposed on the top surface 416 of the frame 400 and extends across the top of the glass 212. The thickness of the background or filler layer 430 is substantially the same as the thickness of the flange 223 of the fixed rail 224, and the top surface of the rail 222 and the background 430 are generally coextensive.

On top of the rail 422 and the background or filler 430 is a cel 432. As will be understood, FIG. 9 comprises only a portion of the light box 200, and a mirror image of the apparatus shown in FIG. 9 exists on the opposite side of the light chamber 206. Accordingly, the frame 410 includes a second half on the opposite side of the lamp chamber 206, and is disposed in conjunction with the opposite side thereof and also in conjunction with the other fixed rail 220, as shown in FIG. 1. The cel 432 accordingly extends entirely across the light portion 204 of the frame 202 and is secured to appropriate pins which in turn are secured to the pin blocks in the respective fixed rails.

The distance between the fixed inner rails 220 and 222 is referred to in the industry as a twelve field distance, and the fixed rails are accordingly known as twelve field rails. The cel 432 is also referred to as a twelve field cel.

The pins or pin blocks which are associated with the fixed rails 220 and 222 are appropriately termed in the trade "twelve field pins" for holding the twelve field cels. It is the distance between the pins, or pin blocks, rather than the size of the pins (or pin blocks) that is determinative. There are also used in the trade what are termed "sixteen field cels" and the use of such sixteen field cels is contemplated by the apparatus of the present invention. The sixteen field cels are supported by or secured to sixteen field pins.

On top of the cel 432 is shown a portion of a transparent platen 502. The platen biases downwardly against the cel to hold it in place from above. At the same time, the background or filler 430, supported on the cover 212, provides an upward bias for the cel 432. The cel is thus held securely in place.

The portion of the cel 432 and the background 430 which is disposed above the lamp chamber 206 is illuminated from below by the plurality of tubes or lamps 210 disposed in the lamp chamber 206. A camera (not shown) disposed above the light box 200 accordingly is able to photograph the cel 432, and any other cel appropriately secured between the fixed rails along the length of the light box 200.

FIG. 10, which is a view in partial section of the apparatus of FIG. 1 taken generally along lines 10—10 of FIG. 1, comprises a view generally continuing the view of FIG. 9. It illustrates the movable rail 244 used in conjunction with a sixteen field cel 436 and with the apparatus discussed above in conjunction with FIG. 9.

It will be noted that a vee shaped groove 203 extends downwardly into the frame 202 from the top surface of the frame. The groove 203 is disposed outwardly, with respect to the light portion 204 of the light box 200 and also with respect to the slot 218, to which it is parallel. The groove 203 is disposed between the groove 218 in which the fixed rail 222 is disposed and between the slot or groove 246 in which the movable outboard rail 244 is disposed and in which it moves. The rail 244 includes a horizontally extending portion 245, the top surface of which is generally coplanar with the top surface of the fixed rail 222, including its horizontally extending portion 223. The horizontally extending portion 245 also includes a lower vee shaped section which extends into the groove 203. The purpose of the groove 203 and the mating vee section of the horizontally extending portion 245 which cooperates with the groove 203 is to provide stability to the movable rail 244 as it moves away from, or out of, the frame 202 (see FIG. 1).

The movable rail 244 also includes a top surface 350, which is spaced apart from, and is substantially parallel to, the upper surface of the horizontally extending portion 245. An inverted tee shaped groove or channel 352 extends downwardly into the rail 354 from the top surface 350. The groove or channel 352 is substantially similar in both configuration and dimension to the groove or channel 334 in the fixed rail 222, shown in FIGS. 9 and 10, and groove or channel 248, shown and discussed above in conjunction with FIGS. 4 and 5. The grooves 248, 334, and 352, as well as a similar groove, not shown, which extends downardly into the fixed rail 220 (see FIG. 1) each receive pin blocks, such as pin blocks 300 and 320, as discussed above in conjunction with FIGS. 7, 8, and 9. A pin block 300, which has been discussed above as a center pin block, with its pin 310 extending upwardly from the pin block, is shown disposed in the groove or channel 352.

Extending downwardly through the rail 244, and communicating with the groove 352, is a slot 354. The slot 354 in turn is aligned with a slot 356 which extends through the frame 302. A plate 358 extends through the aligned slots 354 and 356 and communicates with the groove or channel 352. The plate is secured to the rail 244 by a screw 360, shown in phantom in FIG. 10. The arrangements between the rail 244, and its respective slots, and the plate 358, is substantially the same as that which has been described above in conjunction with FIGS. 3, 4, and 5 with respect to the rail 240, its aligned slots, and the plate 252 secured to it.

In FIG. 10, the pin 310, and its pin block 300, may be referred to as a sixteen field pin, and a parallel pin is disposed on the opposite side of the light chamber 204 and secured to the outer movable rail 240 (see FIGS. 1, 2, 3, 4, and 5).

A sixteen field cel 436 is shown secured to the pin 310, and disposed on the top surface 350 of the rail 244. The cel 436 also extends across a background or filler 434, which is disposed on the aligned top surfaces of the horizontally extending portion 245 of the rail 244, and across a top surface of the inner, fixed rail 242. The cel 436 also extends across the top surface 416 of the wall 412, and across the top surface of the glass 212. The glass 212 extends between the horizontally extending flange 416 of the frame 410 on the top surface 418 of the flange 416, and across the lamp chamber 206 to the mating, mirror image, of the flange or arm 416 of the frame 410.

It will be noted that the frame 410 is shown biased upwardly by the compression spring(s) 408 to cause the top or upper surface 416 of the wall 412, and the top surface of the glass 212, to be disposed against the bottom of the filler or background 434. Thus, the glass 212, the background or filler 434, and the sixteen field cel 436 are all disposed against each other, similar to the way or manner in which the glass 212, the background or filler 430, and the twelve field cel 432 are shown disposed against each other in FIG. 9. Thus, the cels, whether they be twelve field cels or sixteen field cels, are disposed against their appropriate background or fillers and the glass 212. The spring 408 biases the frame 410 upwardly to allow the juxtaposition orientation of the cels, background, and glass if a sixteen field cel is being used. The sixteen field cel, it is noted, is somewhat wider than the twelve field cel, and the offsetting heights of the top surfaces of the various portions of the fixed and movable rails thus allow for adequate compensation and height for the various portions of the apparatus.

As in FIG. 9, the glass platen 502 is shown in FIG. 10 as disposed on top of the cel 436. The glass platen 502 is part of the platen assembly 500 shown in FIG. 1 as secured to the slide box 40. It will be noted in FIG. 1 that the platen assembly 500 is in its "down" position, which appears to be spaced apart only slightly from the top of the slide box 40. However, it will be understood that the light box 200 is disposed on and secured to the top of the slide box 40, as discussed above, and that the platen assembly 500 extends over the top of the light box. In FIG. 1, the light box 200 is shown spaced apart for clarity from the slide box 40 and accordingly appears to be on top of the platen assembly 500. It will be understood that the platen assembly 500, while secured to the slide box 40, is actually spaced above the light box 200 and, as is shown in FIGS. 9 and 10, the glass 502 of the platen assembly 500, when the platen assembly 500 is in its "down" position, is disposed on top of the cels, whether they be twelve field cels or sixteen field cels.

The platen assembly 500 is shown in FIGS. 11, 12, and 13, in addition to FIG. 1. FIG. 11 is a top view of the platen assembly 500, and FIG. 12 is a side view of platen assembly 500, taken generally along line 12—12 of FIG. 11. FIG. 13 is a view in partial section of the platen assembly 500 taken generally along line 13—13 of FIG. 11. In both FIGS. 12 and 13, the platen assembly 500 is shown disposed above the slide box 40, and without the light box 200, which is secured to the top of the slide box. This is simply for purposes of clarity. It will be understood that the platen assembly 500 is disposed above the light box 200 (see FIG. 1 and FIGS. 9 and 10) which is in turn secured to the slide box 40. For the following detailed discussion of the platen assembly 500, reference will be made to FIGS. 1, 11, 12, and 13.

The platen assembly 500 includes a movable glass platen 502, the purpose of which is to provide a downward bias on the top of the cels secured to the light box 200, as shown in FIGS. 9 and 10. The platen 200, preferably made of clear glass, is shown in FIGS. 9 and 10 as being disposed on top of the cels 432 and 436, respectively. The cels are photographed through the platen 502 from above. The platen assembly 500 is secured to the slide box 40 and accordingly moves therewith, and of course also with the light box 200 which is also secured to the slide box. Limited relative movement of the platen 502 is accomplished through actuating cylinders and pistons, as described below. The limited movement of the platen 502 is primarily for the purpose of positioning the platen vertically and in a Y direction with respect to the light box 200.

The platen assembly 500 includes a frame 504 which is secured about the periphery of the glass platen 502. The frame 504 is in turn secured to a pair of brackets 506 and 526 for support and movement. The bracket 506 includes a horizontally extending plate 508 which is secured to the one side of the frame 504. The bracket 526 also includes a horizontally extending plate 528 which is secured to the opposite side of the frame 504 from, but in alignment with, the plate 508. Extending upwardly from the plates 508 and 528 are a pair of vertical plates 510 and 530, respectively. The vertical plates are disposed at substantially a right angle (perpendicular) to the horizontal plates. In turn, the vertical plates 510 and 530 are secured respectively to a pair of outer sleeves 512 and 532, respectively.

Extending into the sleeves 512 and 532 are a pair of cylinder guides 516, and 536, respectively. The guides 516 and 536 comprise tubular members or pistons. The guides 516 and 536 are preferably a pair of tubular members which extend into the outer sleeves 512 and 532. They are of a slightly less diameter than the sleeves for easy relative movement with respect to the outer sleeves. The outer sleeves and the tubular guides function in a manner corresponding to pistons and cylinders, with the outer sleeve comprising the cylinders and the tubular guides comprising the pistons. The brackets 506 and 526, it will be noted, are secured to the outer sleeves 512 and 532, respectively.

Also secured to the outer sleeve 512 and 532 are a pair of plates 514 and 534. The plates 514 and 534 extend outwardly substantially perpendicular to the longitudinal axis of the outer sleeves.

The guides 516 and 536 are secured to a pair of plates 518 and 538, respectively, with the plates 518 and 538 extending generally in the direction of, and aligned with, the longitudinal axis of the guides 516 and 536, and also in the general direction of the longitudinal axis of the sleeves 512 and 532, respectively. Secured to the plates 518 and 538 are a pair of outwardly extending plates 520 and 540, respectively. The plates 520 and 540 are substantially parallel to the plates 514 and 524, respectively.

The outer sleeves 512 and 532 are secured to the platen frame 504 through the brackets 506 and 526, respectively. The plates 514 and 534 are also secured to the outer sleeves and accordingly move therewith. Movement of the outer sleeves accordingly results in movement of the platen 502 which is secured to and carried by the frame 504. The guides 516 and 536 are disposed within the sleeves 512 and 532, respectively, and the outer sleeves move on the guides to move the platen 502 in the Y direction. The Y direction has been discussed above in conjunction with the slide box 40 and the light box 200.

Relative movement between the sleeves and the guides is accomplished by a pair of actuating cylinder assemblies which are secured to the sleeves and the guides. An actuating cylinder assembly 522 extends between the plates 514 and 520, while an actuating cylinder assembly 542 extends between the plates 534 and 540. The actuating cylinder assemblies 522 and 542 comprise a piston and cylinder arrangement, with the cylinders secured to the plates 520 and 540, and the pistons, which are movable within the cylinders, secured to the plates 514 and 534. A piston rod 524 is shown secured to the plate 514, and a piston rod 544 is shown secured to the plate 534. The rods 524 and 544 comprise piston rods secured to the pistons movable relative to the cylinders. The cylinder assemblies 522 and 542 may be hydraulic, pneumatic, or as desired. For clarity, the controls for operating the actuating cylinder assemblies have been omitted, since they are well known and understood in the art. The actuating cylinder assemblies 522 and 542 operate substantially simultaneously to cause movement of the platen 502 in what has been defined as the Y directions.

The plate 518 is secured to one end of a hinge assembly 550, as is the plate 538. The hinge assembly 550 includes an outer sleeve 552, which is preferably a tubular (pipe) member which is secured to, and spaced between, a pair of flanges 554 and 556. The flange 554 is secured to the plate 518 by appropriate securing elements, such as a nut and bolt 548. Similarly, the plate 538 is appropriately secured to the flange 556 by appropriate securing elements, such as a nut and bolt assembly 548. As best shown in FIGS. 12 and 13, the sleeve 552 is disposed at the end (the lower ends) of the generally parallel plates or flanges 554 and 556, while the plates 518 and 538 are secured to the opposite ends (the upper ends) of the flanges, remote from the sleeve 552. The sleeve 552 is preferably secured by welding to the flanges 554 and 556, thus comprising a rigid connection between the sleeve and the flanges.

Parallel to the sleeve 552, but spaced apart therefrom, is a bar 546, best shown in FIG. 11. The bar 546 is appropriately secured, as by welding, to the plates 518 and 538. The bar 546 accordingly provides a solid link securing the plates 518 and 538 together.

Extending through the sleeve 552 is a rod 558. The rod 558 includes a threaded portion at each end, which threaded portions extend through appropriate apertures in the flanges 554 and 556. A pair of nuts 560 threadedly engage the ends of the rod 558 to secure the hinge assembly 550 to a pair of brackets 570 and 580. The brackets 570 and 580, best shown in FIG. 1 and in FIG. 12, are used to secure the hinge assembly to the slide box 40. The platen 500 accordingly moves relative to the slide box 40, and also relative to the light box 200 which is secured to the top of the slide box 40.

The bracket 570 is shown in detail in FIG. 12. It includes a base plate 572 which is disposed against and secured to the slide box 40 by appropriate fasteners, such as screws 578. An arm 574 extends outwardly from the base plate 572, substantially perpendicular therefrom. The arm 574 includes an upwardly and outwardly extending portion 576, remote from the plate 572, which is in turn disposed against the flange 554 of the hinge assembly 550. The distal end of the upwardly extending portion 576 of the arm 574 includes an aperture or hole through which one end of the rod 558 extends. The nut 560 is in turn secured by threaded engagement to the end of the rod 558 to fasten or secure the hinge assembly 550 to the bracket 570.

The bracket 580 is substantially identical to the bracket 570, and the opposite end of the rod 558 extends through a hole in the bracket 580 and is secured thereto by another nut 560. It will be noted, as shown in FIGS. 1 and 12, that the flanges 554 and 556, and the sleeve 552 to which the flanges are secured, are disposed between the brackets 570 and 580. The respective flanges are disposed against each other. The spacing between the upwardly extending arms of the brackets 570 and 580 is accordingly substantially the same distance as between the outer surfaces of the flanges 554 and 556.

Pivotal movement of the platen 500, and of the frame 504 which holds the platen 502, is accomplished by a centrally located actuating cylinder 594, and its associated elements. The cylinder 564 is shown in a side view of FIG. 13. A downwardly extending plate 590 is secured to the sleeve 552, as best shown in FIG. 13. Another plate 592 extends substantially perpendicular with respect to the plate 590, and generally parallel to the top or upper surface of the slide box 40 and of the light box 200 secured thereto. The actuating cylinder 594 is secured to the plate 592 through a bracket 596. The bracket 596 is in turn secured to the plate 592 by a plurality of nut and bolt fastener elements 598. There is a pivoting relationship between the cylinder 594 and the bracket 596 which allows relative pivoting movement between the cylinder 594 as a piston within the cylinder 594 is pressurized to move the platen 502.

As best shown in FIG. 13, a rod 600, which comprises a piston rod secured to a piston movable within the cylinder 594, extends upwardly from the cylinder 594 and is secured to the bar 546. As discussed above, there is a rigid connection between the bar 546 and the plates 518 and 538.

Movement of the rod 600 relative to the cylinder 594 accordingly results in movement of the bar 546 and of the plates 518 and 538 to which it is secured. The movement of the plates 518 and 538 is a pivoting movement which pivots about bolt and nut assemblies 548 which secures the plates 518 and 538 to the flanges 554 and 556, respectively. In this manner, there is a limiting vertical pivotal movement of the platen assembly 500 relative to the cels. The platen 502 is as shown in FIGS. 9 and 10, and being in its downward position on top of the cels. The platen also moves in a Y direction a limited amount or distance, as discussed above.

Returning again to FIG. 1, there is shown a pair of plates 370 and 380 spaced upwardly from the fixed rails 220 and 222. The plate 370 is shown at one end of the fixed rails, adjacent the end plate 224, and the plate 380 is shown disposed at the opposite ends of the fixed rails, adjacent the end plate 232. The plates 370 and 380 are appropriately secured to the rails 220 and 222, but extend beyond the rails 220 and 222, to the area of the movable, sixteen field rails 240 and 244.

The purpose of the plates 370 and 380 is to extend beyond the light box 200 (in the X direction) to fill in the space between the fixed rails (the twelve field rails) to thus support cels on either side of the light box. The plates thus take the place of the filler or background 430 or 434, as shown in FIG. 9 and 10, beyond the ends of the light box 200 in the X directions.

The table apparatus described above comprises a table, in which the bed 12 comprises the top of the table, with the slide box 40 secured to the table by the two pairs of splined shafts, which are secured to the table, and which support the slide box for movement over the table top, and the motors 60 and 90 which are secured to the shafts 64 and 94, respectively, for moving the slide box 40 over the table top. The screw shafts and their respective motors are secured to the pairs of splined shafts and accordingly move along the splined shafts in response to the rotation of the screw shafts, which are in turn driven by their respective reversible motors.

The table, slide box, and the splined shafts and screw shafts and motors comprise, without the light box 200, a precision positioning apparatus in which the slide box, and anything secured thereto, may be positioned with precision accuracy over the top of the table. This table apparatus has utility apart from the light box 200, and the fixed movable rails associated therewith. The table and slide box may be used for the precision alignment or placement of machine tools or parts to be worked on for machine tools with only minor modifications, as for example changing the configuration of the slide box, or adding appropriate fixtures thereon.

When the light box 200, and its associated rails, including the fixed rails and the movable rails with their independently controlled reversible motors, is added to the slide box, the table apparatus then comprises a precision system for holding and moving animation cels and background or filler disposed beneath the cels. For example, by supporting one or more cels on the fixed rails, and with an appropriate background disposed on the spring biased frame over the lamp chamber 206, the background may be moved beneath the fixed cels while the cels and background are photographed from above the table apparatus. The pictorial illusion of a cel, or a plurality of cels, moving relative to a background is thus photographed.

When adding the relative movement capability of the movable rails to the fixed rails and to the background or filler there is added additional relative movement to provide additional flexibility for photographing a cel or cels.

It will also be noted that the movement of the movable outer rails may be coordinated with the movement of the light box and slide box, or the movement may be separate therefrom. Furthermore, by controlling the speed of the motors which move the slide box and by also controlling the speed of the motors which move the movable rails, additional relative movement illusions may be created.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What is claimed is:

1. Table apparatus for holding and moving animation cels and background or filler for the cels, comprising, in combination:
    table means, including a bed and a plurality of legs supporting the bed;
    slide box means secured to the table means and movable relative to the bed, including
        a slide box,
        first shaft and support means secured to the table means for supporting the slide box and for moving the slide box in a first direction relative to the bed,
        second shaft and support means secured to the table means for supporting the slide box and for moving the slide box in a second direction relative to the bed.
    fixed rail means secured to the first shaft and support means and movable with the slide box in the second direction for holding a cel;
    light box means secured to the slide box and to the fixed rail means and movable with the slide box and the fixed rail means in the second direction and movable with the slide box relative to the fixed rail means in the first direction, including,
        a frame,
        a lamp chamber secured to the frame, and lamp means in the lamp chamber for providing illumination; and
    movable rail means secured to the light box means, and including a pair of rails spaced apart from each other and disposed adjacent and parallel to the fixed rail means, and movable relative to each other and to the light box means, for holding and moving cels.

2. The apparatus of claim 1 in which the first shaft and support means and the second shaft and support means includes
    splined shaft means secured to the table means for supporting the slide box,
    screw shaft means secured to the splined shaft means and to the slide box, and
    motor means secured to the screw shaft means for rotating the screw shaft means for moving the slide box.

3. The apparatus of claim 2 in which splined shaft means includes a first pair of splined shafts spaced apart from each other and secured to the table means, and the screw shaft means includes a first screw shaft secured to and movable on the first pair of splined shafts for moving the table in the first direction, and the splined shaft means further includes a second pair of splined shafts spaced apart from each other and secured to the table substantially perpendicularly to the first pair of splined shafts, and the screw shaft means includes a second screw shaft secured to the second pair of splined shafts for moving the table in the second direction, and the motor means includes a first motor secured to the first screw shaft and a second motor secured to the second screw shaft, for moving the table independently in the first and in the second directions.

4. The apparatus of claim 3 in which the movable rail means includes a first movable rail secured to the frame, and a first motor for moving the first movable rail relative to the frame.

5. The apparatus of claim 4 in which the movable rail means further includes a second movable rail and a second motor for moving the second movable rail relative to the first movable rail and also relative to the frame.

6. The apparatus of claim 1 in which the slide box means includes platen means movable over the light box means for holding a cel over the lamp chamber.

7. The apparatus of claim 6 in which the platen means includes a transparent platen movable relative to the light box in the second direction, which second direction is a horizontal direction.

8. The apparatus of claim 7 in which the platen means further includes
a frame secured to the transparent platen,
sleeve means secured to the frame and to the slide box, and
means connected to the sleeve means for moving the platen relative to the slide box in the second direction.

9. The apparatus of claim 8 in which the sleeve means includes
an outer sleeve secured to the frame,
a guide disposed in the sleeve and secured to the slide box, and the means connected to the sleeve means for moving the platen is connected to the outer sleeve and to the guide.

10. The apparatus of claim 9 in which the platen means further includes
first rod means pivotally secured to the sleeve means, and to the slide box,
second rod means secured to the sleeve means, and
actuator means secured to the first rod means and the second rod means for moving the sleeve means and the platen relative to the slide box and to the light box in a third direction.

11. The apparatus of claim 1 in which the light box means includes
slot means in the frame adjacent the lamp chamber;
spring means disposed in the slot means for providing an upward bias;
movable frame means disposed in the slot means and against the upward bias of the spring means, and
a cover supported by the movable frame means and extending across the lamp chamber and disposed against the background or filler for the cels by the bias of the spring means.

12. The apparatus of claim 11 in which the fixed rail means includes a first fixed rail and a second fixed rail spaced apart from and substantially parallel to the first fixed rail and the lamp chamber is disposed between the first and second fixed rails.

13. The apparatus of claim 12 in which the slot means includes a first slot disposed between the lamp chamber and the first fixed rail, and a second slot disposed between the lamp chamber and the second fixed rail.

14. The apparatus of claim 13 in which the spring means includes a plurality of compression springs disposed in the first and second slots for biasing the movable frame means and the cover against the background or filler for the cels.

15. The apparatus of claim 14 in which the movable frame means includes
a first vertical wall disposed in the first slot,
a second vertical wall disposed in the second slot,
a first horizontal arm secured to the first vertical arm,
a second horizontal arm secured to the second vertical arm, and the cover extends between and is supported by the first and second vertical arms.

16. The apparatus of claim 15 in which the movable frame means further includes
a third slot in the first vertical wall for receiving some of the plurality of compression springs in the first slot, and
a fourth slot in the second vertical wall for receiving some of the plurality of compression springs in the second slot.

17. The apparatus of claim 16 in which the spring means further includes a plurality of pins secured in the first and second slots, and each spring is disposed above a pin, and the pins and springs extend into the third and fourth slots.

18. The apparatus of claim 1 in which the fixed rail means includes
a first pin block slot,
a first pin block movably disposed in the first pin block slot,
a first fixed pin secured to the first pin block for holding a cel, and
first means for securing the first pin block in the first pin block slot.

19. The apparatus of claim 18 in which the movable rail means includes
a second pin block slot,
a second pin block movably disposed in the second pin block slot,
a second fixed pin secured to the second pin block for holding a cel, and
second means for securing the second pin block in the second pin block slot.

20. Table apparatus for holding and moving cels comprising, in combination,
a table top;
a plurality of legs secured to the table top for supporting the table top;
a slide box disposed over the table top;
shaft means secured to the table top and to the slide box for moving the slide box relative to the table top, including,
splined shaft means secured to the table top for supporting the slide box,
screw shaft means rotatably secured to the splined shaft means and to the slide box, and
motor means for rotating the screw shaft means for moving the slide box means relative to the table top in a first direction and in a second direction;
rail means for holding cels, including fixed rail means secured to the shaft means and to the slide box and movable with the slide box in a first direction but fixed relative to movement of the slide box in the second direction; and
light box means secured to the slide box and to the fixed rail means and movable with the slide box and the fixed rail means in the first direction and movable with the slide box relative to the fixed rail means in the second direction, and including,
a lamp chamber, and
lamp means in the lamp chamber for illuminating the cels held by the rail means.

21. The apparatus of claim 20 in which the rail means further includes movable rail means secured to the slide box and movable relative to the slide box and to the light box.

22. The apparatus of claim 20 in which the splined shaft means includes
   a first splined shaft for supporting the slide box for movement in a first direction, and
   a second splined shaft for supporting the slide box for movement in a second direction.

23. The apparatus of claim 22 in which the screw shaft means includes
   a first screw shaft secured to the second splined shaft for moving the slide box in the first direction, and
   a second screw shaft secured to the first splined shaft for moving the slide box in the second direction.

24. The apparatus of claim 20 in which the splined shaft means comprises
   a first pair of splined shafts spaced apart from each other and secured to the table top for supporting the slide box for movement in a first direction, and
   a second pair of splined shafts spaced apart from each other and secured to the table top for supporting the slide box for movement in a second direction.

25. The apparatus of claim 24 in which the screw shaft means includes
   a first screw shaft secured to the second pair of splined shafts and to the slide box for moving the slide box in the first direction, and
   a second screw shaft secured to the first pair of splined shafts for moving the slide box in the second direction.

26. The apparatus of claim 23 or 25 in which the motor means includes
   a first reversible motor secured to the first screw shaft for moving the slide box in the first direction, and
   a second reversible motor secured to the second screw shaft for moving the slide box in the second direction.

* * * * *